US009896364B2

United States Patent
Smith et al.

(10) Patent No.: US 9,896,364 B2
(45) Date of Patent: Feb. 20, 2018

(54) SYNERGISTIC INTERACTION OF WEAK CATION EXCHANGE RESIN AND MAGNESIUM OXIDE

(71) Applicant: Ecolab USA Inc., St. Paul, MN (US)

(72) Inventors: Kim R. Smith, Woodbury, MN (US); Lee J. Monsrud, Inver Grove Heights, MN (US); Keith E. Olson, Apple Valley, MN (US); Kristen Mills, Hopkins, MN (US); Erik C. Olson, Savage, MN (US); Erin Jane Dahlquist Howlett, West St. Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 28 days.

(21) Appl. No.: 14/884,908

(22) Filed: Oct. 16, 2015

(65) Prior Publication Data
US 2016/0031735 A1    Feb. 4, 2016

Related U.S. Application Data

(62) Division of application No. 13/206,879, filed on Aug. 10, 2011, now Pat. No. 9,193,610.

(51) Int. Cl.
*B08B 3/00* (2006.01)
*C02F 5/00* (2006.01)
(Continued)

(52) U.S. Cl.
CPC .............. *C02F 5/00* (2013.01); *C02F 1/42* (2013.01); *C02F 1/72* (2013.01); *C02F 1/725* (2013.01);
(Continued)

(58) Field of Classification Search
CPC ...... C02F 1/42; C02F 1/725; C02F 1/72; C02F 5/00; C02F 2303/22; C02F 2001/425
(Continued)

(56) References Cited

U.S. PATENT DOCUMENTS 3,492,159 A    1/1970 Nowlin
3,810,834 A    5/1974 Jones
(Continued)

FOREIGN PATENT DOCUMENTS

DE    19521140 A1 * 12/1996 ........... C11D 3/1273
EP    0133677    3/1985
(Continued)

OTHER PUBLICATIONS

International Search Report and Written Opinion, issued in connection to International Application No. PCT/US2012/050129, 11 pages, dated Feb. 1, 2013.
(Continued)

*Primary Examiner* — Eric W Golightly
(74) *Attorney, Agent, or Firm* — McKee, Voorhees & Sease, PLC

(57) ABSTRACT

The present invention relates to methods, apparatuses, and systems for treating water. The methods, apparatuses and systems reduce scaling associated with solubilized water hardness using a sequence of water treatment agents, including an inlet, one or more treatment reservoirs containing a first treatment agent that is an exhausted ionic resin that is incapable of performing ion exchange and a second treatment agent consisting of a metal oxide and/or hydroxide compound, an outlet, and a treated water delivery line.

16 Claims, 2 Drawing Sheets

(51) Int. Cl.
 *C02F 1/42* (2006.01)
 *C02F 1/72* (2006.01)
(52) U.S. Cl.
 CPC .... *C02F 2001/425* (2013.01); *C02F 2303/22* (2013.01)
(58) Field of Classification Search
 USPC .................... 210/205, 252, 282, 284; 134/93
 See application file for complete search history.

(56) References Cited

U.S. PATENT DOCUMENTS

| | | | |
|---|---|---|---|
| 3,816,276 | A | 6/1974 | Ichiki et al. |
| 4,000,127 | A | 12/1976 | Cornelissens et al. |
| 4,126,549 | A | 11/1978 | Jones et al. |
| 4,457,847 | A | 7/1984 | Lorenc et al. |
| 4,515,697 | A | 5/1985 | Elmaleh et al. |
| 4,518,505 | A | 5/1985 | Lim et al. |
| 4,581,042 | A | 4/1986 | Willmore |
| 4,666,609 | A | 5/1987 | Tsuneki et al. |
| 4,692,314 | A | 9/1987 | Etani |
| 4,874,526 | A | 10/1989 | Grade et al. |
| 4,874,541 | A | 10/1989 | Steimel et al. |
| 4,895,905 | A | 1/1990 | Schneider et al. |
| 4,954,259 | A | 9/1990 | Elmaleh et al. |
| 4,973,409 | A | 11/1990 | Cook |
| 5,024,783 | A | 6/1991 | Busch et al. |
| 5,034,155 | A | 7/1991 | Soeder et al. |
| 5,073,299 | A | 12/1991 | Cook |
| 5,093,005 | A | 3/1992 | Greaves |
| 5,152,403 | A | 10/1992 | Patel |
| 5,166,074 | A | 11/1992 | Vessey et al. |
| 5,317,063 | A | 5/1994 | Komatsu et al. |
| 5,330,670 | A | 7/1994 | Turcotte et al. |
| 5,368,779 | A | 11/1994 | Snethen |
| 5,393,436 | A | 2/1995 | Nagan |
| 5,525,257 | A | 6/1996 | Kleinstuck et al. |
| 5,547,612 | A | 8/1996 | Austin et al. |
| 5,603,862 | A | 2/1997 | Taya et al. |
| 5,630,985 | A | 5/1997 | Williams et al. |
| 5,639,501 | A | 6/1997 | Vembu et al. |
| 5,665,783 | A | 9/1997 | Katzakian, Jr. et al. |
| 5,708,108 | A | 1/1998 | Carey et al. |
| 5,776,875 | A | 7/1998 | Tang et al. |
| 5,861,100 | A | 1/1999 | Nagasaki |
| 6,113,797 | A | 9/2000 | Al-Samadi |
| 6,132,624 | A | 10/2000 | Suzuki et al. |
| 6,146,903 | A | 11/2000 | Weatherbury et al. |
| 6,183,649 | B1 | 2/2001 | Fontana |
| 6,290,812 | B1 | 9/2001 | Rampotas et al. |
| 6,312,604 | B1 | 11/2001 | Denkewicz, Jr. et al. |
| 6,334,904 | B1 | 1/2002 | Ahnsorge et al. |
| 6,346,206 | B1 | 2/2002 | Shimura |
| 6,579,570 | B1 | 6/2003 | Lang et al. |
| 6,593,379 | B1 | 7/2003 | Leiter et al. |
| 6,660,167 | B1 | 12/2003 | Walder et al. |
| 6,797,197 | B2 | 9/2004 | Steimel et al. |
| 7,090,780 | B2 | 8/2006 | Ito et al. |
| 7,332,080 | B1 | 2/2008 | Zarraga et al. |
| 7,357,705 | B2 | 4/2008 | Miyanaga |
| 7,377,945 | B2 | 5/2008 | Cornelius et al. |
| 7,445,014 | B2 | 11/2008 | Sakane et al. |
| 7,465,760 | B2 | 12/2008 | Amiconi et al. |
| 7,709,434 | B2 | 5/2010 | Smith et al. |
| 7,749,329 | B2 | 7/2010 | Smith et al. |
| 7,754,097 | B2 | 7/2010 | Woyciesjes |
| 2001/0037976 | A1 | 11/2001 | Blonigen et al. |
| 2002/0155976 | A1 | 10/2002 | Boskamp et al. |
| 2003/0196960 | A1 | 10/2003 | Hughes |
| 2003/0209499 | A1 | 11/2003 | Haase |
| 2004/0159605 | A1 | 8/2004 | Hughes |
| 2005/0127323 | A1 | 6/2005 | Tyler et al. |
| 2005/0224100 | A1 | 10/2005 | Maunsell et al. |
| 2006/0069001 | A1 | 3/2006 | Song |
| 2006/0157416 | A1 | 7/2006 | Seidel et al. |
| 2007/0021315 | A1 | 1/2007 | Weber |
| 2007/0105744 | A1 | 5/2007 | Amiconi |
| 2008/0274928 | A1 | 11/2008 | Smith et al. |
| 2008/0274939 | A1 | 11/2008 | Monsrud et al. |
| 2008/0287340 | A1 | 11/2008 | Corradini et al. |
| 2009/0048144 | A1 | 2/2009 | Corradini et al. |
| 2009/0142459 | A1 | 6/2009 | Batchelder |
| 2009/0151083 | A1 | 6/2009 | Orlandi et al. |
| 2009/0298738 | A1 | 12/2009 | Kneipp et al. |
| 2010/0150818 | A1 | 6/2010 | Haase |
| 2010/0263688 | A1 | 10/2010 | Monsrud et al. |
| 2011/0067732 | A1 | 3/2011 | Smith et al. |

FOREIGN PATENT DOCUMENTS

| | | |
|---|---|---|
| EP | 0243908 A2 | 11/1987 |
| EP | 0605288 A1 | 7/1994 |
| EP | 0957066 B1 | 11/1999 |
| EP | 1905339 B1 | 4/2008 |
| GB | 724683 | 2/1955 |
| GB | 772775 | 4/1957 |
| GB | 826770 | 1/1960 |
| GB | 1015612 | 1/1966 |
| GB | 1289386 | 9/1972 |
| GB | 1304328 | 1/1973 |
| GB | 1433221 | 4/1976 |
| GB | 2410742 A | 8/2005 |
| JP | 11253967 | 9/1999 |
| WO | 9948821 | 9/1999 |
| WO | 9948822 | 9/1999 |
| WO | 0037596 | 6/2000 |
| WO | 0246106 | 6/2002 |
| WO | 03087460 | 10/2003 |
| WO | 2008065099 | 6/2008 |

OTHER PUBLICATIONS

Material Safety Data Sheet, Amberlite IRC-50 Ion-Exchange Resin, 4 pages, issued on Jul. 20, 2009.
CWG/USA Overview, http://santaclariawaterconditioning.com/html/With_fl/Images?CWG_USA_Overview, 3 pages, retrieved from the Internet on Apr. 21, 2010.
Demineralised Whey, http://www.apv.com/us/applications/dairy/whey/demineralisedwhey/Demineralised+Whey.asp, 3 pages, retrieved from the internet on Aug. 10, 2011.
Demineralized Whey, http://www.niro.com/niro/mcsdoc.nsf/WebDoc/ndkw5y8gnylibrary, 2 pages, retrieved from the internet on Aug. 10, 2011.
Filtersorb SP Q&A, http://www.woodbrosind.com/documents/FILTERSORBQUESTIONS.pdf, 6 pages, retrieved from the internet on Apr. 21, 2010.
High performance scale prevention, (softener-alternative) media., http://www.nextfiltration.com/DownloadFiles/next-ScaleStop-lit.pdf, 2 pages, retrieved from the internet on Apr. 21, 2010.

* cited by examiner

SYNERGISTIC INTERACTION OF WEAK CATION EXCHANGE RESIN AND MAGNESIUM OXIDE

CROSS-REFERENCE TO RELATED APPLICATIONS

This application is a divisional of U.S. application Ser. No. 13/206,879 filed Aug. 10, 2011, issued Nov. 24, 2015 as U.S. Pat. No. 9,193,610, which claims priority and is entitled "Synergistic Interaction of Weak Cation Exchange Resin and Magnesium Oxide". The entire contents of this patent application is hereby expressly incorporated herein by reference including, without limitation, the specification, claims, and abstract, as well as any figures, tables, or drawings thereof.

FIELD OF THE INVENTION

The invention relates to a system or apparatus and methods for treating an aqueous system, such as a water source or stream (i.e. water treatment). The invention relates to use of a threshold agent shedding weak cation exchange resin followed by use of magnesium oxide for the treatment of an aqueous system. In particular, the system or apparatus and methods according to the invention provide synergistic reduction of hard water scaling and reduced or eliminated cementing of the magnesium compound through the combined, sequential use of a first treatment using an exhausted divalent cation exchange resin followed by a second treatment using a water insoluble magnesium compound, such as a magnesium oxide. Methods of cleaning using the treated aqueous system are also disclosed and beneficially provide reduced water scaling on treated surfaces.

BACKGROUND OF THE INVENTION

Water hardness has numerous deleterious effects in various systems. For example, when hard water alone, or in conjunction with cleaning compositions, contacts a surface, it can cause precipitation of hard water scale on the contacted surface. Hard water is also known to reduce the efficacy of detergents. In general, hard water refers to water having a total level of calcium and magnesium ions in excess of about 100 ppm expressed in units of ppm calcium carbonate. Often, the molar ratio of calcium to magnesium in hard water is about 2:1 or about 3:1. Although most locations have hard water, water hardness tends to vary from one location to another.

Water hardness has been addressed in a number of ways. Most cleaning products contain one or more ingredients whose presence is intended to offset the effects of hard water. Examples include phosphorus-containing and especially phosphate-containing acids (or more commonly salts thereof, including sodium or potassium salts) such as sodium tripolyphosphate (STPP) and sodium etidronate. Other such ingredients include threshold agents, such as aminocarboxylates (for example, ethylenediaminetetraacetic acid (EDTA), diethylenetriaminepentaacetic acid (DTPA), nitrilotriacetic acid (NTA) and their salts) and polycarboxylates (for example, polyacrylates, polymethacrylates and olefin/maleic acid copolymers). However, there may be difficulties in including such ingredients in cleaning products, as several of these ingredients have been banned in various states or subjected to regulatory amount limitations due to environmental concerns (e.g., eutrophication and biodegradability) or other factors, and some are very costly.

Another method currently used to soften water is via ion exchange, e.g., by adding sodium to the water to exchange the calcium and magnesium ions in the water with sodium associated with a resin bed (or the like) in a water softening unit. The calcium and magnesium adhere to a resin in the softener. When the resin becomes saturated it is necessary to regenerate it using large amounts of sodium chloride dissolved in water. The sodium displaces the calcium and magnesium, which is flushed out in a briny solution along with the chloride from the added sodium chloride. When water softeners regenerate they produce a waste stream that contains significant amounts of chloride, creating a burden on the system, e.g., sewer system, in which they are disposed of, including a multitude of downstream water re-use applications like potable water usages and agriculture.

The use of an insoluble magnesium compound, such as a magnesium oxide bed, is used to prevent or reduce scaling (e.g. hard water scaling, silica scaling). Use of magnesium is believed to cause calcium carbonate in hard water to crystallize into a non-scaling form rather than crystals of calcite causing hard water scale is a further method. However, certain performance difficulties often impede its ability to control water hardness. In some instances, the magnesium oxide bed is limited by its slow "cementing." "Cementing" is a phenomenon in which the discrete particles of magnesium oxide become tightly bound together, such as through the bridging of the magnesium oxide granules by calcium carbonate. This reduces the efficiency of the magnesium oxide, creating a non-fluidizable bed that is no longer free-flowing. The cementing effect makes it very difficult to remove the granules from the bed, cartridge or other types of containers, causing deleterious effects to the system for treating hard water as it eventually forms into an intractable block during the course of use and limiting commercial viability.

A further method of counteracting water hardness is to use chelating agents or sequestrants which are intended to be mixed with hard water in an amount sufficient to handle the hardness. However, in many instances the water hardness exceeds the capacity of the chelant or threshold agent added to the composition.

In yet a further method of counteracting water hardness, a cation exchange resin with a divalent ion exchange capacity fully exhausted can be used to form and shed a threshold agent in situ into a system. However control over the quantity of threshold agent shed can be difficult.

Accordingly, it is an objective of the claimed invention to develop a method for reducing hard water scaling superior to the use of water treatment systems using exhausted cation exchange resins or magnesium oxide beds, cartridges or other types of containers alone. A further object of the invention is a system for eliminating hard water scaling for use in various cleaning applications.

A further object of the invention is a system and methods for eliminating the cementing of magnesium oxide beds, cartridges or other types of containers.

BRIEF SUMMARY OF THE INVENTION

In an embodiment, the present invention provides methods for reducing hard water scaling in a water source. In one aspect, the methods comprise contacting a water source with a first ionic resin water treatment agent; contacting the treated water source with a second metal oxide and/or hydroxide compound water treatment agent, wherein the first water treatment agent sheds a threshold agent, and wherein the solubilized water hardness in the treated water source does not result in hard water scaling According to embodiments of the invention, the ionic resin and metal oxide and/or hydroxide compound are housed within one or more treatment reservoirs. The and metal oxide and/or hydroxide compound is preferably selected from the group consisting of metal oxides, metal hydroxides, and combinations thereof, more specifically the conversion agent is selected from the group consisting of magnesium oxide, magnesium hydroxide, aluminum oxide, aluminum hydroxide, titanium oxide, titanium hydroxide, and combinations thereof. In a certain embodiment the compounds are free of aluminum and/or zinc. In a further aspect, the metal oxide and/or hydroxide compound is insoluble in water and is contained in a column, cartridge or other holding container and the column is agitated by a method selected from the group consisting of the flow of water through the column, by fluidization, mechanical agitation, high flow backwash, recirculation, and combinations thereof.

According to further embodiments, the ionic resin is a weak cation exchange resin. In a further aspect, the cation exchange resin is exhausted and sheds a threshold agent that is an acrylic acid polymer, a methacrylic acid polymer or combinations thereof.

In a further embodiment, the present invention provides an apparatus or system for treating a water source for use in a cleaning application. In one aspect, the apparatus or system may comprise: (a) an inlet for providing a water source to a first treatment reservoir; (b) one or more treatment reservoirs housing (1) a first water treatment agent consisting of a substantially water insoluble ionic resin loaded with a plurality of one or more multivalent cations, followed by (2) a second water treatment agent consisting of a metal oxide and/or hydroxide compound; (c) an outlet for providing treated water from the one or more treatment reservoirs; and (d) a treated water delivery line for providing the treated water to a cleaning application.

In further aspects, there is no filter between the first and second treatment reservoir and/or the outlet and the treated water delivery line. Still further, in another aspect, the one or more of the treatment reservoirs comprise a portable, removable cartridge.

In a further embodiment, the present invention provides methods of using a treated water source to clean an article. In an aspect, the methods comprise treating a water source with a first ionic resin water treatment agent comprising a substantially water insoluble ionic exchange resin; treating the water source with a second metal oxide and/or hydroxide compound water treatment agent, wherein the treating steps comprise running the water over a solid source of first the ionic resin and running the water over the second metal oxide and/or hydroxide compound, and wherein the solubilized hardness of the water is increased compared to the initial solubilized hardness of the water source; and contacting an article with the treated water or a use solution formed by combining the treated water with an additional cleaning agent (e.g. detergent) such that the article is cleaned without causing hard water scaling on the article.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
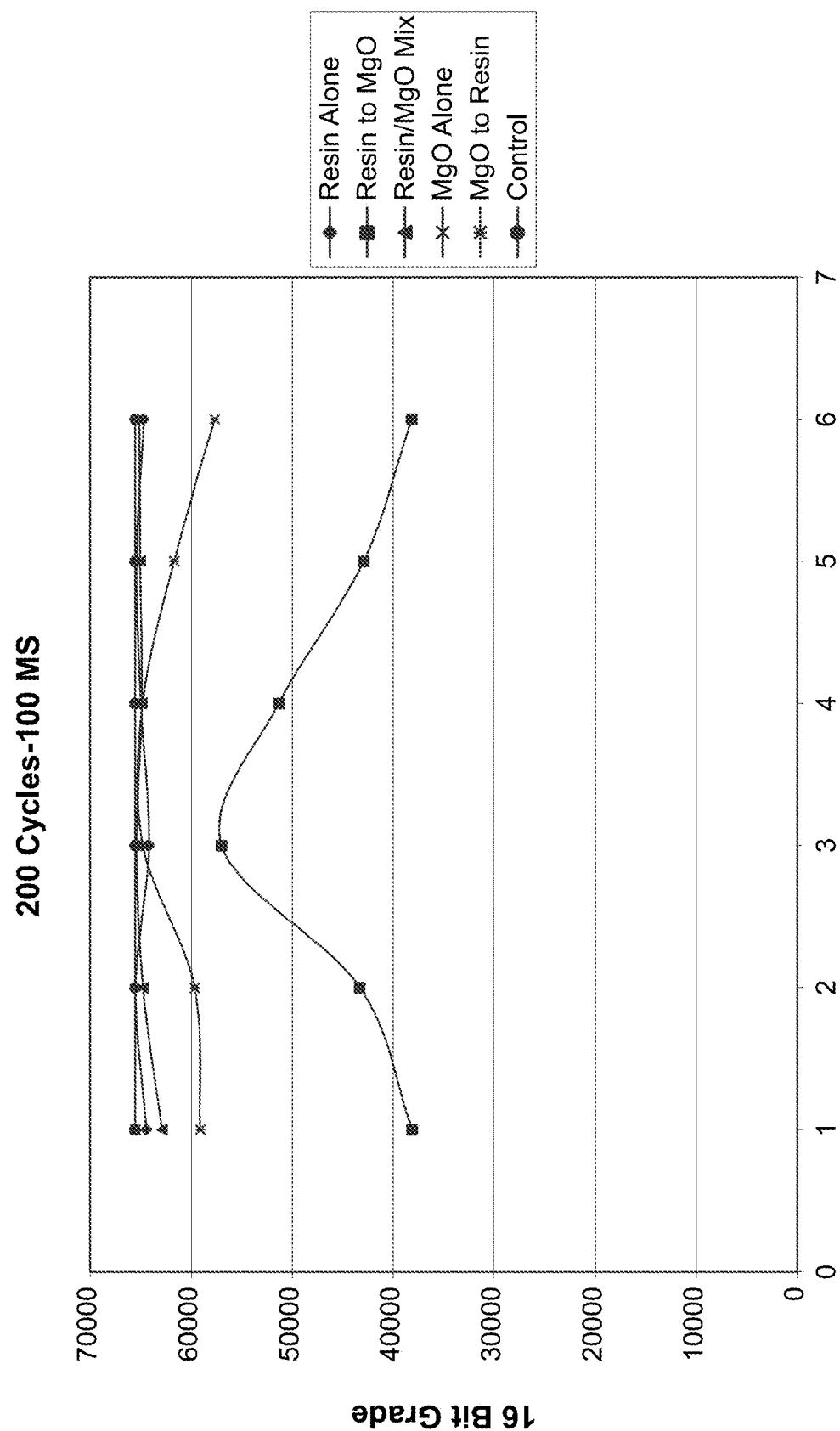
FIG. 1 shows the effect of elution order on scale mitigation of MgO and a weak cation exchange resin according to an embodiment of the invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to systems, apparatus and methods for reducing hard water scaling. In particular, the present invention relates to water treatment for reducing scale formation and reducing and/or eliminating cementing of a magnesium oxide bed, cartridge or other type of container used for the water treatment according to the invention. The present invention also relates to methods of employing treated water, for example, in cleaning processes. The systems, apparatus and methods of the present invention have many advantages over existing techniques. For example, according to the invention, certain sequential combinations of a resin and an insoluble magnesium compound interact synergistically, providing hard water scale inhibition superior to either technology alone. In addition, the present invention mitigates the concern and deleterious effects of the magnesium oxide bed, cartridge or other type of container cementing.

The water treated in accordance with the methods of the present invention has many beneficial effects, including, but not limited to, reduction of scale and soiling in areas where hard water can cause soiling, protecting equipment, e.g., industrial equipment, from scale build up, protecting water treatment equipment (e.g., magnesium compounds in beds, resins and other types of containers) from the deleterious effects of cementing, increased cleaning efficacy when used with conventional detersive compositions, and reducing the need for specific chemistries, e.g., those containing threshold agents, chelating agents, or sequestrants, or phosphorous, in downstream cleaning processes.

The embodiments of this invention are not limited to particular systems, apparatus and methods, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities refers to variation in the numerical quantity that can occur.

As used herein, the term "builder" refers to a compound that is a chelating agent or sequestering agent. As used herein, the terms "builder," "chelating agent," and "sequestrant" are synonymous. The terms "chelating agent" and "sequestrant," as used herein, refer to a compound that forms a complex (soluble or not) with water hardness ions (from the wash water, soil and substrates being washed) in a specific molar ratio. Chelating agents that can form a water soluble complex include sodium tripolyphosphate, EDTA, DTPA, NTA, citrate, and the like. Sequestrants that can form an insoluble complex include sodium triphosphate, zeolite A, and the like. As used herein, the terms "builder," "chelating agent," and "sequestrant" are synonymous.

The term "cleaning," as used herein, means to perform or aid in soil removal, bleaching, microbial population reduction, or combination thereof.

As used herein, the term "conversion agent" refers to a species that causes solubilized calcium in water to substantially precipitate from solution as calcium carbonate in a form which is thought to be a more thermodynamically unfavorable form. Although not intending to limit the scope of the invention, according to one theory of the invention, a conversion agent may have a mechanism of action that causes precipitation of solubilized calcium in the crystal form of aragonite rather than as the thermodynamically favorable crystal form calcite. According to this non-limiting theory of an aspect of the invention, aragonite is a fragile crystal which doesn't bind well to surfaces and doesn't form hard water scale while calcite is a more robust crystal which binds tightly to surfaces, forming a hard water scale that's not seen with aragonite. An example of a conversion agent according to the invention is the magnesium compound, such as a magnesium oxide bed.

As used herein, the term "free of" or "substantially free of" refers to a composition, mixture, or ingredients that does not contain a particular agent or compound or to which only a limited amount of such agent or compound has been added. For example, substantially free of, according to an embodiment of the invention, includes an amount of the particular agent or compound less than about 5 wt %. In some embodiments, such an amount of a particular agent or compound is less than about 2 wt-%. In other embodiments, such an amount of a particular agent or compound is less than about 0.5 wt-%. According to a further embodiment, free of, refers to the lack of the particular agent or compound in a composition. According to embodiments of the invention, the conversion agent is free of aluminum and/or free of zinc.

As used herein, the term "hard surface" includes showers, sinks, toilets, bathtubs, countertops, windows, mirrors, transportation vehicles, floors, and the like.

As used herein, the terms "magnesium oxide bed," "magnesium oxide cartridge," or the like, refer to any type of a magnesium oxide water treatment system employing a bed, cartridge, or other type of container as one skilled in the art will ascertain. These terms are not intended to limit the structure of the magnesium oxide treatment system according to the invention and are used merely as exemplary descriptors of suitable structures, others of which one of skill in the art will ascertain.

As used herein, the term "solubilized water hardness" refers to hardness minerals dissolved in ionic form in an aqueous system or source, i.e., $Ca^{++}$ and $Mg^{++}$. Solubilized water hardness does not refer to hardness ions when they are in a precipitated state, i.e., when the solubility limit of the various compounds of calcium and magnesium in water is exceeded and those compounds precipitate as various salts such as, for example, calcium carbonate and magnesium carbonate. As used herein, the term "water soluble" refers to a compound that can be dissolved in water at a concentration of more than 1 wt-%.

The term "threshold agent," as used herein, refers to a compound that inhibits crystallization of water hardness ions from solution, but that need not form a specific complex with the water hardness ion. This distinguishes a threshold agent from a conversion agent, chelating agent or sequestrant as disclosed herein. Threshold agents are capable of maintaining hardness ions in solution beyond its normal precipitation concentration. See e.g., U.S. Pat. No. 5,547,612. Threshold agents may include, for example and without limitation, polycarboxylates, such as polyacrylates, polymethacrylates, olefin/maleic copolymers, olefin/acrylate copolymers and the like. According to the invention a threshold agent is shed from an exhausted resin according to the invention. According to an embodiment of the invention, a the exhausted ionic resin sheds a threshold agent, which as understood by a skilled artisan, interferes with the crystallization of calcium carbonate and reduces the ability to form a crystal. The term "water," as used herein, refers to potable water as obtained from a municipal or private water system, e.g., a public water supply or a well. The water can be hard water, city water, well water, water supplied by a municipal water system, water supplied by a private water system, treated water, or water directly from the system or well. In an embodiment, the present method employs water that wasn't treated with a polymeric water softener bed such as in use today and which requires periodic regeneration with sodium chloride to work. In general, "hard water" refers to water having a level of calcium and magnesium ions in excess of about 100 ppm or 17 grains. Often, the molar ratio of calcium to magnesium in hard water is about 2:1 or about 3:1. Although most locations have hard water, water hardness tends to vary from one location to another.

The term "water soluble" refers to a compound that can be dissolved in water at a concentration of more than 1 wt-%. The terms "slightly soluble" or "slightly water soluble" refer to a compound that can be dissolved in water only to a concentration of 0.1 to 1.0 wt-%. The term "water insoluble" refers to a compound that can be dissolved in water only to a concentration of less than 0.1 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems and apparatuses of the present invention can include, consist essentially of, or consist of the component and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

According to an embodiment of the invention there is a synergistic effect of combined used of a water treatment system sequentially employing a weak cation exchange resin shedding threshold agent followed by a magnesium oxide bed, cartridge or other type of container for the conversion of hard water scale into non-scaling hard water. According to the invention it is unexpected that the combination of a threshold-shedding resin with a conversion agent (e.g. magnesium oxide bed, resin or other type of structure) provides synergistic efficacy in reducing hard water scaling. This is counterintuitive as the threshold agent and conversion agent would be expected to interfere with the other's mode of action.

Reducing Scaling Caused by Water Hardness in Water Sources

In some aspects, the apparatuses, systems and methods of the present invention are used to treat a water source such that the solubilized water hardness does not cause scaling on a surface treated with the water source. The present invention surprisingly results in a water source that does not have a reduced solubilized water hardness. According to an embodiment of the invention, the water hardness (e.g. measured by ppm of calcium and magnesium ions and/or grains) in a treated water source is increased without causing scaling on a treated surface.

The water source treated according to the invention may be any source of water having a hardness that would be benefited by treatment in accordance with the methods of the present invention. Exemplary water sources suitable for treatment using the methods of the present invention include, but are not limited to, ordinary tap water such as water from a municipal water source, or private water system, e.g., a public water supply or a well. The water can be city water, well water, water supplied by a municipal water system, water supplied by a private water system, and/or water directly from the system or well. In some embodiments, the water source is not an industrial process water, e.g., water produced from a bitumen recovery operation. In other embodiments, the water source is not a waste water stream.

The apparatus, systems and methods of the present invention include treating a water source such that the solubilized hardness does not cause and/or reduces the scaling on a treated surface. In some aspects, the solubilized hardness of the water is increased and does not cause and/or reduces the scaling on a treated surface. In some aspects, the present invention provides methods for reducing or inhibiting scale formation in an aqueous system.

In some embodiments, an aqueous system, i.e., a water source, is contacted sequentially with two water treatment agents—a first exhausted ionic resin capable of shedding a conversion agent (either bound or unbound), followed by a second insoluble magnesium compound. Without wishing to be bound by any particular theory, it is thought that the sequential use of the water treatment agents first cause the shedding of threshold agents into a water source as a result of the exhausted ionic resin. One theory of the invention is that the threshold agent shed by the exhausted ionic resin cleans off (i.e. solubilizes) the remaining solubilized calcium water hardness ions from the magnesium oxide bed. The removal of the calcium water hardness ions from the magnesium oxide bed prevents the deleterious effects of cementing on the magnesium compound.

A further non-limiting theory of the invention is that the insoluble magnesium oxide may cause the water hardness to substantially precipitate via an interfacial reaction from solution as calcium carbonate in the thermodynamically unfavorable crystal form aragonite rather than as the thermodynamically favorable crystal form calcite. The resultant crystals are very small in size, are inert and non-reactive, and do not stick to surfaces. For example, aragonite crystals formed according to embodiments of the invention may be between approximately 10 nm and 1000 nm in size. Because it is inert and small in size, the precipitated calcium carbonate does not need to be filtered or removed from the treated water. Rather, the treated water containing the precipitated crystals of calcium carbonate can be used for any downstream application.

According to a still further non-limiting theory of the invention, the water hardness may be re-dissolved into the treated water source, causing an apparent increase in total solubilized water hardness (i.e. ppm of calcium and magnesium ions and/or measured grains). Without being limited to a particular theory of the invention, contacting water with the sequential water treatment agents of the present invention reduces the scaling of surfaces contacted by the treated water according to the invention, and leads to a reduction and/or elimination of cementing one the magnesium oxide bed, cartridge or other types of containers.

The methods of the present invention are especially effective at removing or preventing scale formation wherein the scale includes calcium salts, e.g., calcium phosphate, calcium oxalate, calcium carbonate, calcium bicarbonate or calcium silicate. The scale which is intended to be prevented or removed by the present invention may be formed by any combination of the above-noted ions. For example, the scale may involve a combination of calcium carbonate and calcium bicarbonate.

In some embodiments the water source has a pH of between about 6 and about 11 prior to treatment using the methods, apparatuses, or systems of the present invention. In some embodiments, the pH of the water source prior to treatment is greater than about 8. In some embodiments, the pH of the water source is raised to greater than 9, and in some embodiments the pH is greater than 10 prior to treatment.

Apparatus and Systems

Embodiments of the invention include one or more treatment reservoirs for contacting a water source with the water treatment agents, including first the resin shedding the threshold agent followed by the insoluble magnesium compound conversion agent. Embodiments of the invention include a system or apparatus having a single treatment reservoir, one or more treatment reservoirs in parallel and/or one or more treatment reservoirs in series. In embodiments which include more than one treatment reservoir, each treatment reservoir may include the same one or more water treatment agents or may include different one or more water treatment agents. For example, the water source may be passed over a plurality of reservoirs, in the same or in separate vessels, including the same or different water treatment agents, i.e. water treatment agents in the form of an exhausted ionic resin shedding a conversion agent and/or an insoluble magnesium compound that may be bound to a supporting material. Regardless of the number and/or arrangement of treatment reservoirs, according to the invention, the water source is first treated with the exhausted ionic resin, followed by treatment with the insoluble magnesium compound.

The treatment reservoir may be any shape or size appropriate for the use of the water and the volume of water to be treated. In some embodiments, the apparatus includes a vessel which includes a treatment reservoir. The treatment reservoir may be contained in a vessel which can be small, such as a canister filter-type vessel as used for small drinking purification processes. Alternatively, the vessel can be large, such as a large water treatment tank as used in whole house water softening. The treatment reservoir may be for example, a tank, a cartridge, a filter bed of various physical shapes or sizes, or a column. In some embodiments, the treatment reservoir is pressurized. In other embodiments, the treatment reservoir is not pressurized.

Some embodiments of the invention include a treatment reservoir including a water inlet and a water outlet. In some embodiments, the water may enter and exit the treatment reservoir through the same opening or channel. In some embodiments, the treatment reservoir is contained within a vessel. Water to be treated enters the vessel through an inlet located at or near the top of a vessel, flows downward along the vessel wall or walls, and enters the treatment reservoir at the bottom of the vessel. The water flows upward through the treatment reservoir toward the top of the vessel and exits the vessel through an outlet at or near the top of the vessel.

Figure 2:
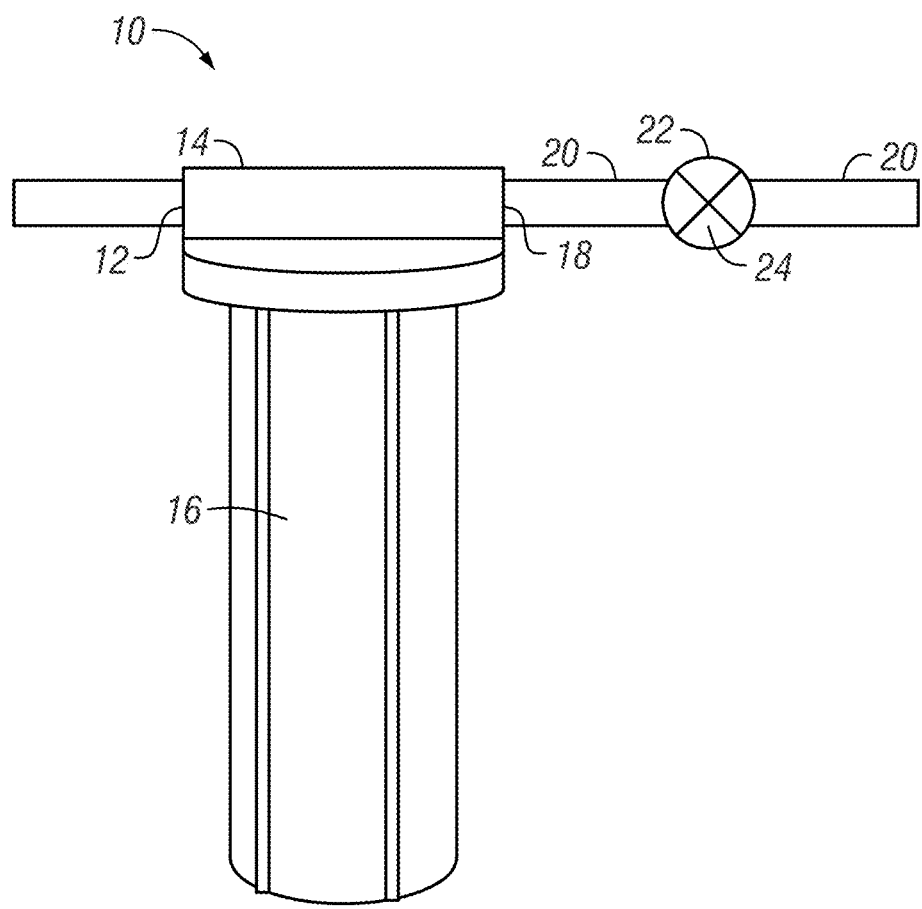
FIG. 2 shows a schematic of a treatment reservoir according to an embodiment of the invention.

An example of a treatment reservoir according to an embodiment of the invention is shown in FIG. 2, a schematic of a treatment reservoir apparatus of the present invention, shown at reference 10. The apparatus includes: an inlet 12 for providing the water source to a treatment reservoir 14; a treatment reservoir 14 including one or more water treatment agents 16; an outlet 18 for providing treated water from the treatment reservoir; and a treated water delivery line 20. According to preferred embodiments of the invention, the water treatment agents 16 include a first exhausted ionic resin and a second insoluble magnesium compound. In some embodiments, the treated water delivery line 20 provides water to a selected cleaning device. In some embodiments, there is no filter between the outlet and the treated water delivery line. A flow control device 22 such as a valve 24 can be provided in the treated water delivery line 20 to control the flow of the treated water into a second treatment reservoir (not shown in FIG. 2) which then has a second water delivery line to provide the water to the selected end use device, e.g., a ware washing machine, a laundry washing machine.

In some embodiments, the entire treatment reservoir can be removable and replaceable. In other embodiments, the treatment reservoir can be configured such that water treatment agents contained within the treatment reservoir is removable and replaceable (e.g. replace the exhausted ionic resin and/or insoluble magnesium compound bound to a supporting material). In some embodiments, the treatment reservoir includes a removable, portable, exchangeable cartridge including a water treatment agent, e.g., magnesium, bound to a supporting material.

Exhausted Ionic Resins

According to embodiments of the invention, an ionic resin is the first water treatment agent contacting a water source. The ionic resin used in combination (specifically, followed by treatment with the second water treatment agent) with the insoluble magnesium compound prevents scale formation on surfaces contacted by the water treated according to the invention.

In a further aspect, a substantially water insoluble resin material is provided, although a variety of resin materials may be used with the apparatuses of the present invention. Further description of water insoluble resin materials is disclosed, for example, in U.S. patent application Ser. No. 12/764,621, entitled "Methods and Apparatus for Controlling Water Hardness," the entire contents of which are hereby expressly incorporated herein by reference. In some embodiments, a resin is capable of binding magnesium ions preferentially over binding calcium ions. The resin for use as a supporting material can include any ion exchange resin. Preferably, the ion exchange resin is exhausted. For example, in some embodiments, the resin includes an acid cation exchange resin, e.g., a weak acid cation exchange resin, or a strong acid cation exchange resin. In other embodiments, the supporting material is a chelating resin. According to a preferred embodiment the resin is an exhausted weak cation exchange resin.

According to the invention, the first water treatment agent sheds a threshold agent into the water source, such as an acrylic acid polymer or methacrylic acid polymer. In some embodiments, the supporting material is not inorganic. In some embodiments, the supporting material comprises a polymer having sulfonic acid substituents. For example, in some embodiments, the supporting material does not include a ceramic material, and/or zeolites.

In preferred embodiments, the resin material is an exhausted resin material. As used herein, the term "exhausted resin material" refers to an ion exchange resin material that can control water hardness, but that is incapable of performing an ion exchange function. In some embodiments, an exhausted resin material has a surface that is substantially loaded with a plurality of one or more multivalent cations, and is thus unable to exchange ions with a water source when contacted with a water source. The exhausted resin materials of the present invention do not control water hardness through an ion exchange mechanism. That is, the surface of an exhausted resin material is inert, as it is loaded with a plurality of multivalent cations.

The first water treatment agent may include a resin substantially loaded with a plurality of one or more multivalent cations. As used herein, the term "multivalent cations" refers to cations having a valency of 2 or higher. In some embodiments, the multivalent cations include a mixture of calcium and magnesium ions. The calcium and magnesium ions may be loaded on to the resin material at a ratio of from about 1:10 to about 10:1, about 1:5 to about 5:1, about 1:3 to about 3:1, about 1:2 to about 2:1, or from about 1:1 of calcium ions to magnesium ions. In some embodiments, the mixture includes a 2:1 ratio of calcium to magnesium ions.

In other aspects, the water treatment agent includes a substantially water insoluble resin material, wherein the resin material is loaded with a plurality of cations. The cations may be selected from the group consisting of a source of column 1*a*, 2*a* or 3*a* elements from the Periodic Table. In some embodiments, the cations do not include calcium. In some embodiments, the cations are selected from the group consisting of hydrogen ions, sodium ions, magnesium ions, aluminum ions, zinc ions, titanium ions, and mixtures thereof. In some embodiments the cations are substantially free or free of aluminum. In further embodiments the cations are substantially free or free of zinc. The resins for use in the present invention may include, or exclude, any one or more than one of these cations.

In some embodiments, the resin material includes an acid cation exchange resin. The acid cation exchange resin may include a weak acid cation exchange resin, a strong acid cation exchange resin, and combinations thereof. Weak acid cation exchange resins suitable for use in the present invention include, but are not limited to, a cross-linked acrylic acid polymer, a cross-linked methacrylic acid polymer, and mixtures thereof. In some embodiments, resin polymers have additional copolymers added. The copolymers include but are not limited to butadiene, ethylene, propylene, acrylonitrile, styrene, vinylidene chloride, vinyl chloride, and derivatives and mixtures thereof. Examples of commercially available weak acid cation exchange resins are available, and include but are not limited to: C-107 available from Purolite; Amberlite IRC 76 available from Dow; Lewatit CNP 80 WS available from Lanxess; and MAC-3 available from Dow.

Without wishing to be bound by any particular theory, it is thought that in some embodiments, the resin material provides to the water source a substantially low molecular weight polymer material. In some embodiments, the resin material is an acrylic acid polymer that provides a polyacrylate material having a molecular weight of about 150 to about 100,000 to the water source. In other embodiments, the resin material provides a polyacrylate material having a relatively low molecular weight of less than about 20,000 to the water source. Additional description of threshold agent shedding from exhausted resins is disclosed in U.S. patent application Ser. No. 12/764,606, entitled "Catalytic Water Treatment Method and Apparatus" and Ser. No. 12/887,775, entitled "In Situ Cleaning System," the entire contents of which are hereby expressly incorporated herein by reference.

The resin material may be provided in any shape and size, including beads, rods, disks or combinations of more than one shape. In some embodiments, the resin material is selected from the group consisting of a gel type resin structure, a macroporous type resin structure, and combinations thereof. Without wishing to be bound by any particular theory it is thought that the resin particle size may affect the ability of the resin material to control water hardness. For example, in some embodiments, the resin material may have a particle size of from about 0.5 mm to about 1.6 mm. In other embodiments, the resin material may have a particle size as large of 5.0 mm. The resin material may also include a mixture of particle sizes, viz. a mixture of large and small particles.

Other factors that are thought to have an effect on the ability of the resin material to prevent scaling typically caused by water hardness include, but are not limited to, the particle size distribution, the amount of cross linking, and the polymers used. In some embodiments, the ability of the resin material to control water hardness is impacted by whether there is a narrow particle size distribution, e.g., a uniformity coefficient of 1.2 or less, or a wide (Gaussian) particle size distribution, e.g., a uniformity coefficient of 1.5 to 1.9.

Further, it is thought that the selectivity of the resin can be modified to tailor the resin to have an affinity for one ion over another. For example, the amount of cross linking and type of polymers included in the resin are thought to impact the selectivity of the resin. A selective affinity for particular ions over other ions may be beneficial in situations where a high affinity for certain ions, e.g., copper, may be damaging, e.g., foul or poison, to the resin itself. The resin material may bind cations by a variety of mechanisms including, but not limited to, by ionic or electrostatic force.

Preferably, the first water treatment agent is an exhausted ionic resin. However, in some embodiments, the resin may include a weak acid cation exchange resin having H+ ions attached to the active sites, which may then be exhausted, viz. loaded with a plurality of multivalent cations by any of a variety of methods, e.g., by having a water source run over it. In some embodiments, the plurality of multivalent cations includes, but is not limited to, the calcium and magnesium present in the water source. Without wishing to be bound by any particular theory, it is thought that as the water runs over the resin, the calcium and magnesium ions in the water will attach to the resin, thereby neutralizing it. At this point the resin is exhausted as it can no longer exchange ions with the water source. Similar two step or one step processes could be used to bind other water treatment agents such as aluminum, titanium, zinc, and polymorphs of calcium, to the supporting material for alternative embodiments of the invention.

As one skilled in the art shall ascertain, the resin may be provided in any shape and size, including beads, sheets, rods, disks or combinations of more than one shape.

Insoluble Magnesium Compounds

According to embodiments of the invention, a conversion agent, such as an insoluble magnesium compound is the second water treatment agent contacting a water source. The insoluble magnesium compound used in combination (specifically, contacting water after it is treated with the first water treatment agent, i.e. ionic resin) with the ionic resin prevents scale formation on surfaces contacted by the water treated according to the invention. The sequential use of the water treatment agents further reduces and/or eliminates the deleterious effects of cementing on the insoluble magnesium compound, such as a magnesium oxide bed, cartridge or other type of container.

An insoluble compound refers to an agent selected for use with the methods of the present invention having a solubility of less than about 0.01 g/100 mL in water. In some embodiments, low solubility is preferred for longer conversion activity. According to an embodiment of the invention, an insoluble magnesium compound contacts the water treated with the threshold agent shed from the exhausted ionic resin of the first water treatment agent. The treatment with the insoluble magnesium compound is hypothesized, according to one mechanism of action, to promote the precipitate from solution of water hardness ions into a less thermodynamically favorable form, such as aragonite particles. Without wishing to be bound by any particular theory, it is further thought that the insoluble magnesium or calcium may be re-dissolved into the treated water source, causing an apparent increase in total solubilized water hardness.

The insoluble magnesium compound as disclosed herein may also be referred to as a conversion agent and/or catalyst as it may promote such precipitation in a treated water source (i.e., precipitate calcium carbonate out of the water in the form of aragonite). Regardless of the mechanism of action of the insoluble magnesium compound contacting the treated water after the first treatment with the exhausted ionic resin shedding a threshold agent, the second water treatment agent does not result in the reduction in the solubilized water hardness in the water source. Unexpectedly there is an increase in solubilized water hardness and the treated water still exhibits many beneficial effects, including reducing the scale formation on a surface in contact with the treated water source.

The inclusion of the conversion agent, such as the insoluble magnesium compound, substantially reduces or eliminates the need to include builders in cleaning compositions employing the water treated according to the invention. According to an embodiment of the invention, the reduction in hard water scaling is achieved in the absence of builders. According to a further embodiment, cleaning with a composition and the treated water according to the invention may optionally contain no builder, e.g. a detergent free of builder.

According to the invention, the second water treatment agent is a water insoluble compound. Insoluble compounds suitable for use as the second water treatment agent according to the invention include, but are not limited to metal oxides, metal hydroxides, polymorphs of calcium carbonate and combinations and mixtures thereof. In some embodiments, the conversion agent comprises a metal oxide. Metal oxides suitable for use in the methods of the present invention include, but are not limited to, magnesium oxide, aluminum oxide, titanium oxide, and combinations and mixtures thereof. Metal hydroxides suitable for use with the methods of the present invention include, but are not limited to, magnesium hydroxide, aluminum hydroxide, titanium hydroxide, and combinations and mixtures thereof. One or more of the aforementioned agents may be used.

In some embodiments, magnesium oxide is used as the second water treatment agent. In some embodiments, magnesium hydroxide is used as the second water treatment agent. In still yet other embodiments, a combination of magnesium oxide and hydroxide are used as the second water treatment agent according to the invention. In further embodiments the second water treatment agent is substantially free or free of aluminum. In further embodiments the second water treatment agent is substantially free or free of zinc.

Supporting Material for Insoluble Magnesium Compounds

In some aspects of the invention, a supporting material is provided for the insoluble magnesium compound. The supporting material may be any material to which the magnesium compounds can be bound.

In some embodiments, the supporting material has a density slightly higher than the density of water to maximize fluidization and/or agitation of the supporting material. In some embodiments, the supporting material binds cations by ionic or electrostatic force. In some embodiments, the bound cation is magnesium. In some embodiments, the supporting material is inert. The supporting material may be provided in any shape and size, including beads, sheets, rods, disks or combinations of more than one shape.

The magnesium compounds according to the invention do not undergo an ionic exchange which would require recharging of magnesium bed, cartridge or other type of container, as in numerous existing water treatment systems. Rather, the magnesium compound continually promote the precipitation of calcium carbonate over an extended period of time without needing to be replaced for a long time. Water insoluble magnesium compounds as a conversion agent for the treatment of water are disclosed in further detail in U.S. patent application Ser. No. 12/764,606, entitled "Catalytic Water Treatment Method and Apparatus," Ser. No. 12/114,448, entitled "Water Treatment System and Downstream Cleaning Methods," and Ser. No. 12/114,513, entitled "Cleaning Compositions Containing Water Soluble Magnesium Compound and Method of Using Them," the entire contents of which are hereby expressly incorporated herein by reference.

Although not intending to be limited to a particular theory of the invention, as aragonite precipitates on the surface of the second water treatment agent it is believed to act according to one or more possible mechanisms of action, which are not intended to limit the scope of the invention (e.g., promoting precipitation of aragonite and/or solubilizing magnesium and/or calcium into the water source resulting in increased water hardness in the water source).

According to the invention, ongoing experiments have shown that the water treatment agent continues to function after treating 25,000 gallons of water per pound of resin without fail. In practice, the lifespan of the resin will depend upon the water conditions and the presence of contaminants in the water. In average water conditions, the resin may last 1 or 2 years, while in very good water conditions or in low water usage rates it may last 5 or 10 years.

In some embodiments, water contacted with a water treatment agent forms a precipitate which includes a cation which is different from the water treatment agent. For example, in some embodiments the water treatment agent includes a source of magnesium ions and the precipitate formed includes calcium. In some embodiments, water contacted with a water treatment agent forms a calcium precipitate. The calcium precipitate formed using the methods of the present invention is such that the precipitate (e.g. aragonite crystals) flows through the water source harmlessly. That is, in some embodiments, unlike conventional water treatment systems, there is not a need to filter or remove the precipitate from the treated water.

Methods of Use

In some aspects, the present invention provides methods for reducing and/or controlling scaling formation caused by solubilized water hardness. In further aspects, the present invention provides methods for reducing and/or eliminating cementing of the second water treatment agent, namely the insoluble magnesium oxide bed, cartridge or other type of water treatment container.

According to further aspects of the invention the methods, apparatuses, and systems may be used for a variety of purposes and cleaning applications. For example, an apparatus for employing the water treatment methods of the present invention can be connected to the water main of a house or business. The apparatus may further be employed in line before a hot water heater, or after a hot water heater. Thus, an apparatus of the present invention can be used to reduce scaling on surfaces contacted and/or treated by water having solubilized water hardness under a variety of conditions, including for example, in hot, cold and room temperature water sources. In some embodiments, the water to be treated in accordance with the present invention is at a temperature of between about 10° C. and about 90° C. In some embodiments, the temperature of the water to be treated is above room temperature, e.g., greater than about 20° C.

In some aspects, the present invention provides a system for use in a cleaning process. The system includes providing a water source to an apparatus for treating the water source. In some embodiments, the apparatus for treating the water source includes a plurality of the following components: (i) an inlet for providing the water source to a first treatment agent; (ii) a first treatment agent containing an ionic resin (e.g. exhausted ionic resin shedding a threshold agent); (iii) a second treatment agent containing an insoluble magnesium compound (e.g. magnesium oxide bed) that may be bound to a supporting media and/or an unbound additional functional ingredient; (iv) an outlet for providing treated water from the series of at least two sequential water treatment agents; and (v) a treated water delivery line for providing the treated water to a cleaning application, such as an automatic washing machine, such as a ware washing machine. In some embodiments, a device, e.g., a screen, is present in the treatment reservoir(s) in order to keep the water treatment agent(s) contained within the treatment reservoir as the fluid is passing over or through it. In some embodiments, the apparatus is filter less, with no filter between the outlet and the treated water delivery line.

In additional aspects, the methods according to the invention include contacting a water source with a first water treatment agent, followed by contact the first treated water source with a second water treatment agent. Preferably, the first water treatment agent is a weak cation exchange resin capable of shedding a threshold and the second water treatment agent is an insoluble magnesium compound conversion agent, such as a magnesium oxide bed. The step of contacting can include, but is not limited to, running a water source over or through a treatment reservoir or a plurality of treatment reservoirs housing the first and second water treatment agents. The treatment reservoir may house a solid source, e.g., a column, cartridge, or tank, including the water treatment agents. The contact time is dependent on a variety of factors, including, for example, the pH of the water source, the hardness of the water source, and the temperature of the water source.

In some embodiments, the water treatment agent(s) in the treatment reservoir may be in the form of an agitated bed or column. The bed or column can be agitated by any known method including, for example, by the flow of water through the column, fluidization, mechanical agitation or mixing, high flow backwash, recirculation, air sparge, eductor flow, and combinations thereof. In some embodiments, there is a fluidized bed, e.g., a column or a cartridge, in the treatment reservoir. Fluidization is obtained by an increase in the velocity of the fluid, e.g., water, passing through the bed such that it is in excess of the minimum fluidization velocity of the media. Fluidization creates a flowing bed that is in constant agitation when the water is flowing. In other embodiments, the conversion agent is agitated using centrifugal forces created by tangential water flows, mechanical agitation, or ultrasound agitation, for example. The agitation ultimately results in a cleaning of the conversion agent, removing the calcium crystals from the conversion agent, such that water can continue to flow over or through the media with reduced obstruction.

The methods according to the invention may include the agitation of the magnesium compound, such as the bed or column of magnesium oxide in order to further aid in avoiding "cementing," i.e., agglomeration of the particles from the insoluble magnesium compound with the hardness ions from the water source. Such agitation may prevent the precipitant from binding and/or may cause precipitated calcium to become dislodged. According to a non-limiting embodiment of the invention, as aragonite particles precipitate, agitation results the beads or granules of the support media, for example, to bounce into each other and/or to bounce into the solid, unbound, insoluble magnesium compounds. The physical impact knocks off the precipitate, such as aragonite crystals. The loose calcium carbonate crystals may then pass through and exit the treatment reservoir along with the treated water. In this way, the agitation causes it to be self-cleaning, exposing the conversion agent and enabling it to continue nucleating and precipitating the calcium carbonate from the water source. It has been discovered that the catalyst, i.e. the conversion agent, according to embodiments of the invention can continue to perform excellently on very hard water, such as 17 grain water, even after used to treat water for 900 consecutive dish machine cycles, with the inside of the dish machine remaining nearly perfect, whereas untreated was resulted in heavy scale deposits.

Methods of Cleaning an Object

It is contemplated that the methods of the present invention can be used in a broad variety of industrial, household, health care, vehicle care, and other such applications. Some examples include surface disinfectant, ware cleaning, laundry cleaning, laundry sanitizing, vehicle cleaning, floor cleaning, surface cleaning, pre-soaks, clean in place, and a broad variety of other such applications. The methods can reduce any of a variety of detrimental effects of hard water. In an embodiment, the method can reduce precipitation of calcium salt. In an embodiment, the method can reduce scaling.

In some aspects, the present invention relates to a method of cleaning an object, comprising contacting the object with a treated water source obtained according to the methods of the invention. According to an embodiment of the invention, the methods comprise, consist of and/or consist essentially of treating a water source with a first water treatment agent (e.g., an exhausted ionic resin, such as a weak cation exchange resin shedding a threshold agent); treating the water source with a second water treatment agent (e.g., a solid, insoluble magnesium compound, such as a magnesium oxide bed); wherein the treating steps may include running the water over the first and second water treatment agents; contacting an object in need of cleaning with the treated water, such that the solubilized hardness of the water does not cause and/or substantially reduces scaling on the treated surface. The methods of cleaning an object according to the invention may include forming a use solution with the treated water and a detergent prior to contacting an article with the use solution such that the article is cleaned.

The contacting of an article with the treated water source and/or a use solution can include any of numerous methods for applying a composition, such as spraying the composition, immersing the object in the composition, or a combination thereof. The compositions can be applied in a variety of areas including kitchens, bathrooms, factories, hospitals, dental offices and food plants, and can be applied to a variety of hard surfaces having smooth, irregular or porous topography. The treated water source and/or a use concentration of a composition of the present invention can be applied to or brought into contact with an object by any conventional method or apparatus for applying a cleaning composition to an object. For example, the object can be wiped with, sprayed with, and/or immersed in the composition, or a use solution made from the composition. The composition can be sprayed, or wiped onto a surface; the composition can be caused to flow over the surface, or the surface can be dipped into the composition. Contacting can be manual or by machine.

Exemplary articles that can be treated, i.e., cleaned, with the use solution comprising a detersive composition and treated water include, but are not limited to motor vehicle exteriors, textiles, food contacting articles, clean-in-place (CIP) equipment, health care surfaces and hard surfaces. Exemplary motor vehicle exteriors include cars, trucks, trailers, buses, etc. that are commonly washed in commercial vehicle washing facilities. Exemplary textiles include, but are not limited to, those textiles that generally are considered within the term "laundry" and include clothes, towels, sheets, etc. In addition, textiles include curtains. Exemplary food contacting articles include, but are not limited to, dishes, glasses, eating utensils, bowls, cooking articles, food storage articles, etc. Exemplary CIP equipment includes, but is not limited to, pipes, tanks, heat exchangers, valves, distribution circuits, pumps, etc. Exemplary health care surfaces include, but are not limited to, surfaces of medical or dental devices or instruments. Exemplary hard surfaces include, but are not limited to, floors, counters, glass, walls, etc. Hard surfaces can also include the inside of dish machines, and laundry machines. In general, hard surfaces can include those surfaces commonly referred to in the cleaning industry as environmental surfaces. Such hard surfaces can be made from a variety of materials including, for example, ceramic, metal, glass, wood or hard plastic.

In some embodiments, the water treatment methods and systems of the present invention can be applied at the point of use. That is, a water treatment method, system, or apparatus of the present invention can be applied to a water source upstream of an application such as a washing system. In some embodiments this provides methods of in situ water treatment capable of reducing hard water scaling on treated objects without reducing the solubilized water hardness of a water source. In further embodiments, the water treatment is applied immediately prior to the desired end use of the water source. For example, an apparatus of the present invention could be employed to a water line connected to a household or restaurant appliance, e.g., a coffee maker, an espresso machine, an ice machine. An apparatus employing the methods of the present invention may be located in a washing system. For example, it can also be included as part of an appliance which uses a water source, e.g., a water treatment system built into an automatic or manual washing system, a coffee maker, an ice machine, or any other system which may benefit from the use of treated water.

Additionally, an apparatus for employing the water treatment methods of the present invention can be connected to the water main of a house or business. The apparatus can be employed in line before the hot water heater, or after the hot water heater. Thus, an apparatus of the present invention can be used to reduce solubilized water hardness in hot, cold and room temperature water sources.

Because the embodiments of the invention are so useful at reducing and/or eliminating hard water scaling of an object and/or on a surface contacted with a treated water source having solubilized hardness from water (including according to some embodiments increased solubilized water hardness), treated water may be used with detergents having reduced amounts of builders or that are low in builders. In some embodiments, the treated water may be used with detergents which are substantially free of builders. In some embodiments, the treated water may be used with detergents which are substantially free of chelant, builder, threshold agent, sequestrant or combinations thereof. Besides being economically advantageous, the use of low builder detergents or no builder detergents allowed by embodiments of the invention is also more beneficial to the environment, as is the elimination of the need to regenerate the system such as by using sodium chloride.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Effect of Flow Sequence on Synergy Between Magnesium Oxide and Weak Acid Cation Exchange Resin A MgO bed was prepared by placing 100 g magnesium oxide in a chromatography column and rinsing it with 1 gallon of deionized water to remove any fine particulate. A resin bed was prepared using 100 g of Amberlite IRC76 resin which had been previously flushed with 17 grain water hardness until the cation exchange capability had been exhausted. Amberlite IRC76 is a weak cation exchange resin (commercially available from Dow Chemical).

An aliquot of 250 mL 17 grain water was eluted first through the MgO bed followed by the resin bed. A second aliquot was first eluted through the resin bed followed by the MgO bed. Third and fourth aliquots were eluted through each bed alone.

A new bed was prepared by premixing 50 g of the MgO and 50 g of the resin ("mixed bed"). Analysis of the resulting effluents showed quite different results depending on the order of elution through the columns. The columns were also allowed to stand overnight under an additional charge of 17 grain water (to check for cementing) with quite unexpected results, shown in Table 1.

TABLE 1

| | | Effluent Properties | | | |
|---|---|---|---|---|---|
| 1st Step | 2nd Step | Appearance | pH | Hardness (Grains) | Column Cemented |
| MgO | resin | hazy | 9.89 | 17 | Yes |
| resin | MgO | clear | 9.55 | 42 | No |
| resin | none | clear | 8.82 | 17 | No |
| MgO | none | clear | 8.41 | 32 | Yes |
| mixed | none | hazy | 9.87 | 30 | Yes |

The effluent coming through the sequence of resin followed by MgO was resistant to column cementing but also had solubilized what is presumed to be Mg from the MgO or Ca solubilized from a calcium carbonate crystals growing on the column, which led us to suspect that it might be superior in resisting cementing. However, the effluent that went through the MgO column first did in fact cement the MgO system and showed no enrichment in magnesium. Similar performance to the MgO first system was noted for the MgO alone and the mixed media tests. The resin alone, as expected did not cement, but showed no enrichment in water hardness.

The results of Table 1 show that only the sequential treatment using first a resin water treatment agent, followed by a magnesium oxide column, produced clear treated water without cementing the magnesium oxide column. Unexpectedly the "mixed" column resulted in an increased amount of solubilized water hardness (42 grains) compared to the initial water hardness (17 grain). This unexpected increase in water hardness, without the result of hazy treated water (resulting in scaling on treated surfaces), is likely a result of magnesium or calcium solubilized from the insoluble magnesium oxide column added to the water source.

Example 2

Effect of Elution Order on Scale Mitigation of Magnesium Oxide and Weak Acid Cation Exchange Resin A 200 cycle scaling test was run using treated 17 grain water (i.e. hard water) on glasses in a dish machine, using cartridges of MgO and/or Amberlite IRC76 resin set-up in sequences mirroring those described in Example 1.

As shown in FIG. 1, the combination of the water running through the resin first followed by the MgO gave significantly reduced scaling on the treated glasses. The results show that the combination of water treated through the resin following by the MgO column was superior to either system alone, to the MgO first followed by the resin, or to the "mixed" media.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. An apparatus for treating a water source for use in a cleaning application comprising:
    (a) an inlet for providing a water source to a first treatment reservoir;
    (b) one or more treatment reservoirs housing (1) a first water treatment agent, wherein said first water treatment agent is an exhausted ionic resin that is incapable of performing ion exchange followed by (2) a second water treatment agent consisting of a metal oxide and/or hydroxide compound, wherein the first water treatment agent sheds a threshold agent;
    (c) an outlet for providing treated water from the one or more treatment reservoirs; and
    (d) a treated water delivery line for providing the treated water to a cleaning application, wherein the solubilized water hardness in the treated water source does not result in hard water scaling.

2. The apparatus of claim 1, wherein the metal oxide and/or hydroxide is selected from the group consisting of insoluble metal oxides, insoluble metal hydroxides, and combinations thereof.

3. The apparatus of claim 2, wherein the metal oxide and/or hydroxide is selected from the group consisting of magnesium oxide, magnesium hydroxide, aluminum oxide, aluminum hydroxide, titanium oxide, titanium hydroxide and combinations thereof.

4. The apparatus of claim 1, wherein the ionic resin is a weak cation exchange resin selected from the group consisting of a gel type resin structure, a macroporous type resin structure, and combinations thereof, and wherein the resin sheds a threshold agent selected from the group consisting of an acrylic acid polymer, a methacrylic acid polymer and combinations thereof.

5. The apparatus of claim 1, wherein there is no filter between the treatment reservoirs and/or the outlet and the treated water delivery line.

6. The apparatus of claim 1, wherein one or more of the treatment reservoirs comprise a portable, removable cartridge.

7. The apparatus of claim 1, wherein the metal oxide and/or hydroxide is contained in a column, bed, or other type of container housed within a treatment reservoir and the container is agitated by a method selected from the group consisting of the flow of water through the container, by fluidization, mechanical agitation, high flow backwash, recirculation, and combinations thereof.

8. The apparatus of claim 1, wherein the second water treatment agent does not cement.

9. The apparatus of claim 1, wherein the metal oxide and/or hydroxide compound is insoluble in water.

10. The apparatus of claim 1, wherein the exhausted ionic resin is a weak cation exchange resin that is loaded with a plurality of one or more multivalent cations.

11. The apparatus of claim 10, wherein the cation exchange resin is substantially water insoluble.

12. The apparatus of claim 11, wherein the threshold agent is an acrylic acid polymer, a methacrylic acid polymer or combinations thereof.

13. The apparatus of claim 1, wherein the solubilized water hardness is increased in the treated water source and results in greater reduction of hard water scaling that use of an ionic resin water treatment agent or metal oxide and/or hydroxide compound water treatment agent alone.

14. An apparatus for treating a water source to clean an article comprising:
    (a) an inlet for providing a water source to a first treatment reservoir;
    (b) one or more treatment reservoirs housing (1) a first water treatment agent comprising a substantially water insoluble ionic resin, wherein said ionic resin is exhausted so that it is incapable of performing ion exchange; followed by (2) a second water treatment agent consisting of a metal oxide and/or hydroxide compound, wherein the first water treatment agent sheds a threshold agent;
    (c) an outlet for providing treated water from the one or more treatment reservoirs; and
    (d) a treated water delivery line for providing the treated water to a cleaning application, wherein the solubilized water hardness in the treated water source does not result in hard water scaling.

15. The apparatus of claim 14, wherein the ionic resin is a weak cation exchange resin loaded with a plurality of one or more multivalent cations and wherein the metal oxide and/or hydroxide is selected from the group consisting of magnesium oxide, magnesium hydroxide, aluminum oxide, aluminum hydroxide, titanium oxide, titanium hydroxide, and mixtures thereof.

16. The apparatus of claim 15, wherein the metal oxide and/or hydroxide is a magnesium oxide bed, cartridge or other type of container.

\* \* \* \* \*